(12) United States Patent
Kemery et al.

(10) Patent No.: US 8,673,102 B2
(45) Date of Patent: Mar. 18, 2014

(54) INFLATABLE STRUCTURE AND METHOD OF MANUFACTURE

(75) Inventors: Michael Kemery, Beaverton, OR (US); Tobin N. Guild, Beaverton, OR (US); Zvi Rapaport, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 1367 days.

(21) Appl. No.: 11/560,375

(22) Filed: Nov. 16, 2006

(65) Prior Publication Data

US 2007/0069419 A1 Mar. 29, 2007

Related U.S. Application Data

(62) Division of application No. 10/744,239, filed on Dec. 23, 2003, now Pat. No. 7,156,787.

(51) Int. Cl.
*B29C 69/00* (2006.01)
*B29C 65/02* (2006.01)

(52) U.S. Cl.
USPC ............ 156/242; 264/241; 264/510; 264/248

(58) Field of Classification Search
USPC ........... 482/148; 264/241, 510, 248; 156/145, 156/221, 245, 285; 525/240; 428/220, 47.5; 472/134; 446/220; 277/583, 646; 425/405.1
See application file for complete search history.

(56) References Cited

U.S. PATENT DOCUMENTS

| | | | | |
|---|---|---|---|---|
| 4,025,974 A | * | 5/1977 | Lea et al. ........................... | 5/709 |
| 4,305,981 A | * | 12/1981 | Muroi et al. ..................... | 428/31 |
| 4,775,558 A | * | 10/1988 | Haas et al. ...................... | 427/373 |
| 5,137,592 A | * | 8/1992 | LaBianco ....................... | 156/290 |
| 5,435,959 A | * | 7/1995 | Williamson et al. ........... | 264/221 |
| 5,572,804 A | * | 11/1996 | Skaja et al. ........................ | 36/29 |
| 5,830,548 A | * | 11/1998 | Andersen et al. ............. | 428/36.4 |
| 6,187,252 B1 | * | 2/2001 | Rhoades et al. ............... | 264/545 |
| 6,749,418 B2 | * | 6/2004 | Muirhead ...................... | 425/515 |
| 6,837,951 B2 | * | 1/2005 | Rapaport ....................... | 156/145 |
| 7,070,845 B2 | * | 7/2006 | Thomas et al. .................. | 428/69 |
| 7,076,891 B2 | * | 7/2006 | Goodwin ........................... | 36/29 |
| 7,156,787 B2 | * | 1/2007 | Kemery et al. ................ | 482/140 |
| 7,160,404 B2 | * | 1/2007 | Cowelchuk et al. .......... | 156/73.1 |
| 7,208,219 B2 | * | 4/2007 | Polk et al. ................... | 428/292.1 |
| 7,244,483 B2 | * | 7/2007 | Tawney et al. ............... | 428/35.7 |
| 7,291,301 B2 | * | 11/2007 | Cowelchuk et al. ........... | 264/241 |
| 2005/0167029 A1 | * | 8/2005 | Rapaport et al. .............. | 156/145 |
| 2005/0183394 A1 | * | 8/2005 | Hammond et al. .............. | 53/453 |
| 2007/0069419 A1 | * | 3/2007 | Kemery et al. ................ | 264/241 |
| 2007/0207186 A1 | * | 9/2007 | Scanlon et al. ............... | 424/424 |
| 2008/0014453 A1 | * | 1/2008 | Levesque et al. ........... | 428/475.5 |
| 2008/0098620 A1 | * | 5/2008 | Marvin et al. .................... | 36/29 |

(Continued)

*Primary Examiner* — Philip Tucker
*Assistant Examiner* — Vicki Wu
(74) *Attorney, Agent, or Firm* — Banner & Witcoff, Ltd.

(57) ABSTRACT

A method of thermoforming an inflatable structure of dissimilar materials includes the steps of providing a first sheet formed of a first material and a second sheet formed of a second material different than the first material, the second sheet being spaced from the first sheet, and a valve being positioned between the first and second sheets; heating the first and second sheets to a temperature above their glass transition temperature and below their melting point; bonding the first and second sheets together in a mold having an opposed pair of cavities to form an inflatable structure having a seal around a periphery thereof, the valve extending through the seal and being in fluid communication with an interior and exterior of the inflatable structure; and trimming excess material from the periphery of the inflatable structure.

11 Claims, 5 Drawing Sheets

(56) References Cited

U.S. PATENT DOCUMENTS

2008/0147278 A1* 6/2008 Breed .............................. 701/45
2008/0179785 A1* 7/2008 Hammond et al. ........... 264/249
2008/0243342 A1* 10/2008 Breed .............................. 701/45
2008/0246269 A1* 10/2008 Cheung et al. ................ 280/845
2008/0272579 A1* 11/2008 Breed et al. ................. 280/728.2
2008/0284145 A1* 11/2008 Breed ............................ 280/736
2008/0311370 A1* 12/2008 Tatarka .......................... 428/220
2009/0045547 A1* 2/2009 Schindler et al. ............. 264/241
2009/0188056 A1* 7/2009 Labonte ....................... 12/142 P

* cited by examiner

INFLATABLE STRUCTURE AND METHOD OF MANUFACTURE

This application is a divisional of application Ser. No. 10/744,239, filed on Dec. 23, 2003 now U.S. Pat. No. 7,156,787, which is incorporated herein by reference in its entirety.

FIELD OF THE INVENTION

This invention relates generally to inflatable structures to be used in a variety of applications, and, in particular, to inflatable structures formed of dissimilar materials and a method of manufacturing the same.

BACKGROUND OF THE INVENTION

Inflatable structures are well known in the art. Such known inflatable structures are typically thermoformed of a single type of material. Thermoforming involves heating polymer sheets until they are softened, stretching the sheets over a mold, and holding the sheets in the mold until the sheets become rigid. The desired part is then trimmed from the surrounding web. Exemplary inflatable structures include exercise platforms that are used to improve an individual's balance, and bladders for use in shoewear.

Known inflatable exercise platforms are inflatable disks formed of a single material. Such devices are limiting in that the resistance provided on both sides of the disk, and, therefore, the degree of difficulty, is the same. In use, the user stands on the disk and tries to maintain a stable position, thereby improving the balance, coordination and reflexes of the user.

It is an object of the present invention to provide an inflatable structure formed of dissimilar materials that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide an inflatable structure formed of two dissimilar materials that are joined to one another by thermoforming.

In accordance with a first aspect, an inflatable structure includes a first side formed of a first material and a second side formed of a second material different from the first material. A sidewall connects the first side to the second side, and a seam extending around the sidewall joining first and second portions of the sidewall. The first portion is formed of the first material and the second portion is formed of the second material, and the first and second portions are secured to one another by thermoforming. An inflation valve is positioned in the sidewall.

In accordance with another aspect, an inflatable structure includes a first side formed of a rigid thermoplastic and having a textured surface. A second side is formed of a flexible plastic elastomer and has a textured surface. A sidewall connects the first side to the second side. A seam extends around the sidewall and joins first and second portions of the sidewall together. The first portion is formed of the first material and the second portion is formed of the second material. The first and second portions are secured to one another by thermoforming. An inflation valve is positioned in the sidewall and extends through the seam.

In accordance with a further aspect, a method of thermoforming an inflatable structure of dissimilar materials includes the steps of providing a first sheet of material formed of a first material and a second sheet of material formed of a second material different than the first material, the second sheet being spaced from the first sheet, and a valve being positioned between the first and second sheets; heating the first and second sheets of material to a temperature above their glass transition temperature and below their melting point; bonding the first and second sheets of material together in a mold having an opposed pair of cavities to form an inflatable structure having a seal around a periphery thereof, the valve extending through the seal and being in fluid communication with an interior and exterior of the inflatable structure; and trimming excess material from the periphery of the inflatable structure.

Substantial advantage is achieved by providing an inflatable structure thermoformed of dissimilar materials. In particular, an inflatable structure formed of dissimilar materials, when used as an exercise platform, for example, can provide different resistance levels, depending on which way it is oriented, and is collapsible as well, providing for improved transport.

These and additional features and advantages of the invention disclosed here will be further understood from the following detailed disclosure of certain preferred embodiments.

The figures referred to above are not drawn necessarily to scale and should be understood to present a representation of the invention, illustrative of the principles involved. Some features of the inflatable structure depicted in the drawings have been enlarged or distorted relative to others to facilitate explanation and understanding. The same reference numbers are used in the drawings for similar or identical components and features shown in various alternative embodiments. Inflatable structures as disclosed herein, will have configurations and components determined, in part, by the intended application and environment in which they are used.

DETAILED DESCRIPTION OF CERTAIN PREFERRED EMBODIMENTS

Figure 1:
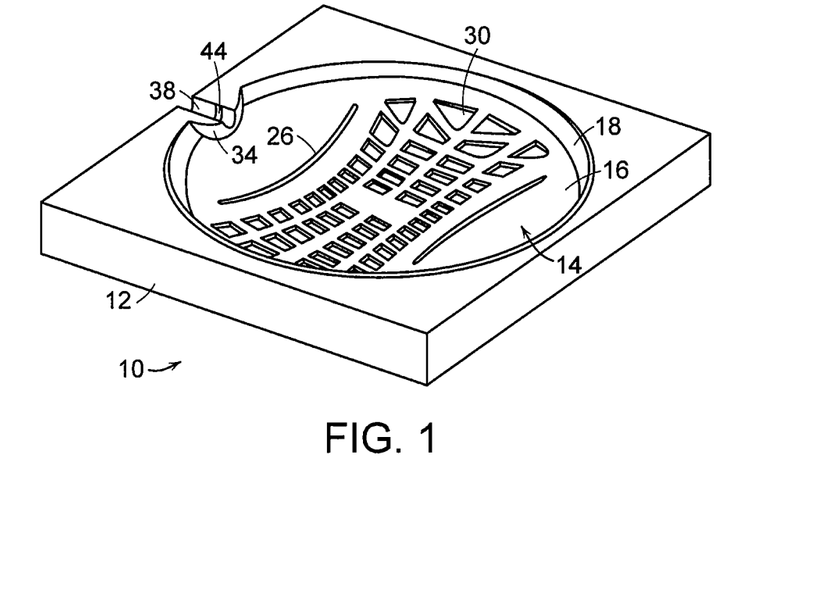
FIG. 1 is a perspective view of a first portion of a mold for use in forming an inflatable structure in accordance with the present invention.
Figure 2:
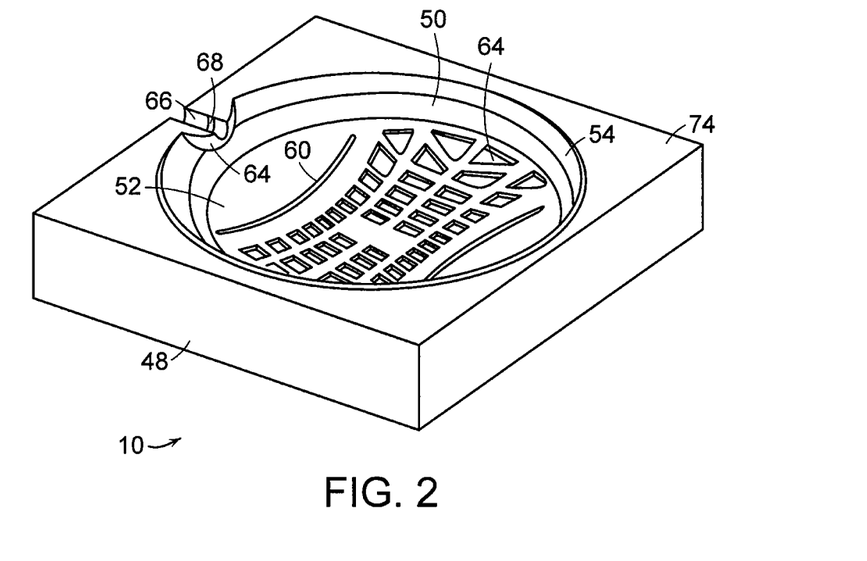
FIG. 2 is a perspective view of a second portion of a mold for use in forming an inflatable structure in accordance with the present invention.
Figure 3:
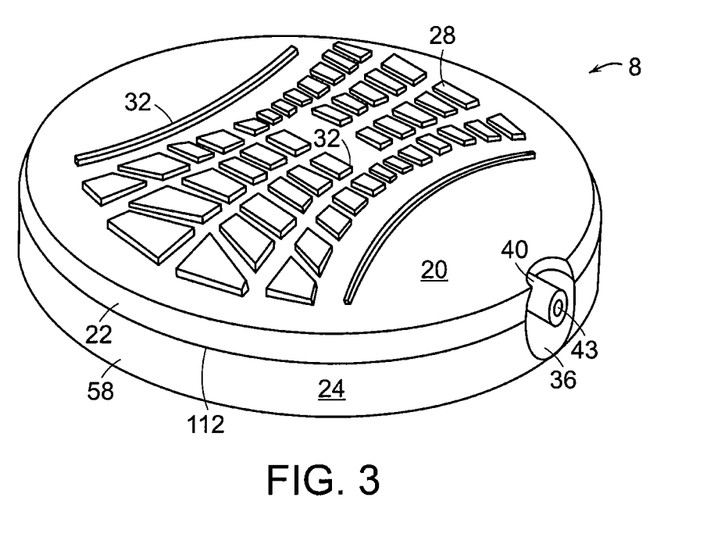
FIG. 3 is a perspective view of an inflatable structure formed with the mold of FIGS. 1-2 in accordance with a preferred embodiment of the present invention, showing a first side of the structure.
Figure 4:
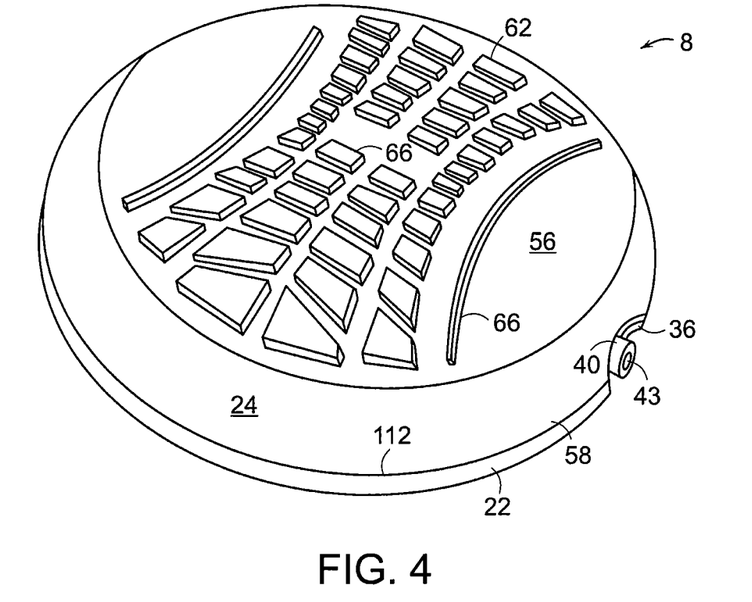
FIG. 4 is a perspective view of the inflatable structure of FIG. 4, showing a second side of the structure.

The present invention may be embodied in various forms. Illustrated herein is a method of thermoforming an inflatable exercise platform. It is to be appreciated that other inflatable structures may be formed in accordance with the present invention, including, for example, bladders for use in shoewear. A method of manufacturing an inflatable structure 8 will now be presented in conjunction with FIGS. 1-7. FIGS. 1-2 show a mold 10 used to form inflatable structure 8, while FIGS. 3-4 illustrate a preferred embodiment of inflatable structure 8, which is an inflatable exercise platform.

A first portion 12 of a mold 10 is shown in FIG. 1 in inverted fashion, and includes a cavity 14 having a floor 16 and a sidewall 18. Floor 16 serves to mold a first side 20 of inflatable structure 8 and sidewall 18 serves to mold a first portion 22 of a sidewall 24 of inflatable structure 8 when inflatable structure 8 is formed.

Floor 16 of cavity 14 may include a pattern 26 that serves to form a textured surface 28 on inflatable structure 8. Pattern 26 may include, for example, a plurality of recesses 30 that act to form a plurality of projections 32 on first side 20 when inflatable structure 8 is formed. In the illustrated embodiment, some of the recesses 30 and corresponding projections 32 are substantially rectangular, while others are narrow elongate ribs. It is to be appreciated that the projections 32 of textured surface 28 provide traction for a user when standing on inflatable structure 8. In other preferred embodiments, textured surface 28 could have a plurality of grooves or recesses formed in first side 20, or a combination of grooves or recesses, and/or projections, formed by corresponding projections and/or recesses or grooves in first portion 12 of mold 10. Textured surface 28 can take any desired shape, which may also provide an aesthetic benefit in addition to the functional advantage of improved traction.

Figure 8:
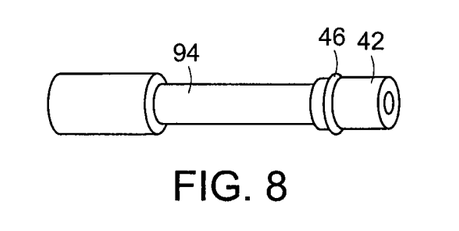
FIG. 8 is a close-up perspective view showing a valve positioned in the mold of FIGS. 1-2, prior to formation of an inflatable structure.

A projection 34 extends radially inward from sidewall 18, and acts to form a portion of a recess 36 formed in sidewall 24 of inflatable structure 8. A semi-circular groove 38 is formed in first portion 12. A first end of groove 38 opens to an exterior of first portion 12, while a second end of groove 38 extends through projection 34 and opens into cavity 14. Groove 38 serves to form a portion of a projection 40 of inflatable structure 8, and receives a valve 42, as seen in FIG. 8. A groove 44 in groove 38 receives a portion of an O-ring 46 of valve 42.

A second portion 48 of mold 10 includes a cavity 50 having a floor 52 and a sidewall 54. Floor 52 serves to mold a second side 56 of inflatable structure 8, and sidewall 54 serves to mold a second portion 58 of sidewall 24 when inflatable structure 8 is formed.

Similar to floor 16 of first portion 12, floor 52 of cavity 50 may include a pattern 60 that serves to form a textured surface 62 on second side 56 of inflatable structure 8. Pattern 60 may include, for example, a plurality of recesses 64 that act to form a plurality of projections 66 on second side 56 when inflatable structure 8 is formed. In the illustrated embodiment, some of the recesses 64 and corresponding projections 66 are substantially rectangular, while others are narrow elongate ribs. In other preferred embodiments, textured surface 62 could have a plurality of grooves or recesses formed in second side 56, or a combination of grooves or recesses, and/or projections, formed by corresponding projections and/or recesses or grooves in second portion 48 of mold 10. Textured surface 62 can take any desired shape, which may also provide an aesthetic benefit in addition to the functional advantage of improved traction.

A projection 64 extends radially inward from sidewall 54, and acts to form a portion of recess 36 when inflatable structure 8 is formed. A semi-circular groove 66 is formed in second portion 48. A first end of groove 66 opens to an exterior of second portion 48, while a second end of groove 66 extends through projection 64 and opens into cavity 50. Groove 66 cooperates with groove 38 of first portion 12 of mold 10 to form projection 40 of inflatable structure 8. During formation of inflatable structure 8, groove 66 cooperates with groove 38 to receive valve 42. A recess 68 in groove 66 receives a portion of O-ring 46 of valve 42.

Figure 5:
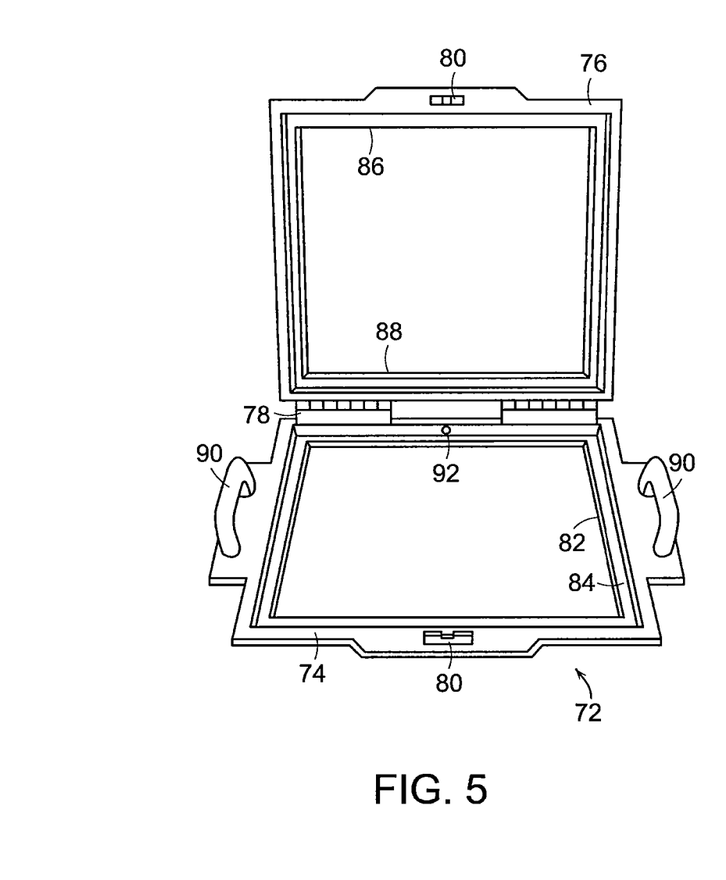
FIG. 5 is a perspective view of a frame used to hold layers of material that are formed in the mold of FIGS. 1-2, shown in an open position prior to the layers of material being positioned in the frame.
Figure 6:
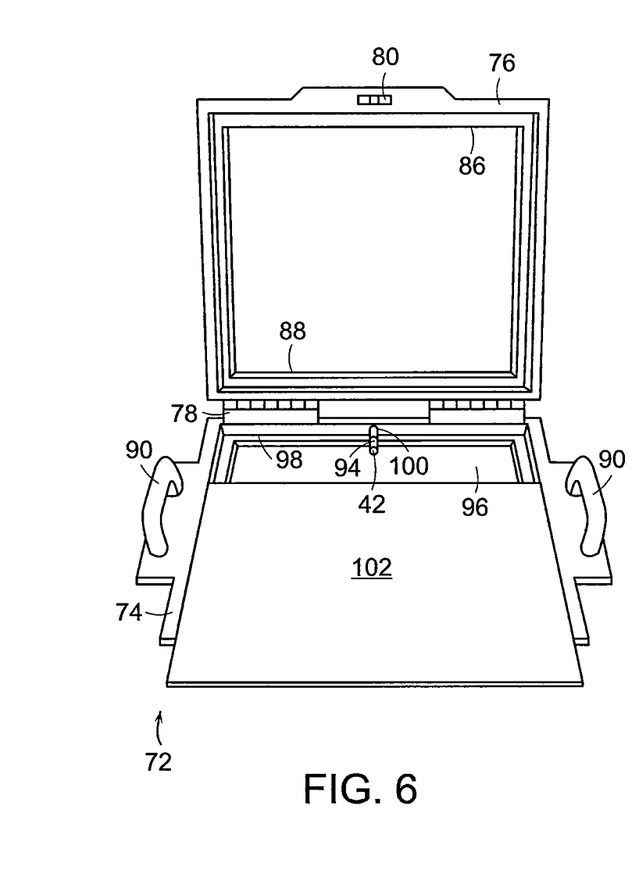
FIG. 6 is a perspective view of the frame of FIG. 5, shown with the layers of material and valve being positioned in the frame.

The overall manufacturing process for forming inflatable structure 8 generally includes the steps of preparation, heating, and bonding. As seen in FIGS. 5-6, the preparation begins with using a frame 72 to hold sheets of material that are used to form inflatable structure 8 during subsequent heating and bonding.

Frame 72 includes a first portion 74 and a second portion 76, connected together by a hinge 78. A locking mechanism 80 is used to secure first and second portions 74, 76 together. First portion 74 has a central aperture 82, surrounded by a shoulder 84. Second portion 76 similarly has a central aperture 86 surrounded by a shoulder 88. In the illustrated embodiment, each of central apertures 82, 86 have a rectangular shape, although other shapes for central apertures 82, 86 are considered to be within the scope of the present invention. A pair of handles 90 on opposed sides of first portion 74 facilitate handling of frame 72. An aperture 92 extends rearwardly through the frame of first portion 74, and receives a nozzle 94, to which valve 42 is attached. Nozzle 94 is in fluid communication with valve 42, and cooperates with valve 42 to inject air between the sheets of material that form inflatable structure 8, as described in greater detail below.

As seen in FIG. 6, a first sheet 96 of a first material, which forms second side 56 of inflatable structure 8, is positioned within first portion 74, rests on shoulder 84 and extends across central aperture 82. A spacer 98 is positioned on shoulder 84 above first sheet 96. Spacer 98 includes an aperture 100 that is aligned with aperture 92. Nozzle 94 is inserted into apertures 100, 92 such that valve 42 extends inwardly into frame 72 and is suspended above first sheet 96. A second sheet 102 of a second material, which forms first side 20 of inflatable structure 8 and is different than the first material of first sheet 96, is then positioned on first portion 74 (seen here being placed in position). Second sheet 102 is separated from first sheet 96 by spacer 98, since first and second sheets 96, 102 must be kept separate as they are heated. Second portion 76 is then folded down onto first portion 74 and secured thereto by locking mechanism 80. Consequently first and second sheets 96, 102 are captured within frame 72 and are spaced apart from one another.

In a preferred embodiment, first sheet 96 is a flexible thermoplastic, such as polyurethane. In certain preferred embodiments, first sheet 96 has a modulus of elasticity of approximately 50,000 or less. Other suitable materials for first sheet 96 will become readily apparent to those skilled in the art, given the benefit of this disclosure.

In a preferred embodiment, second sheet 102 is formed of a rigid thermoplastic, such as a blend of acrylonitrile butadiene styrene (ABS) and polyurethane. In other preferred embodiments, second sheet 102 could be a blend of polyurethane and any of ethyl vinyl acetate, ABS alloys, and polycarbonate. Second sheet 102 may be reinforced with fiberglass. In certain preferred embodiments, second sheet 102 has a modulus of elasticity of approximately 150,000 or more. Other suitable materials for second sheet 102 will become readily apparent to those skilled in the art, given the benefit of this disclosure.

It is to be appreciated that first and second sheets 96, 102 are to be formed of materials that are chemically compatible and capable of being bonded together when subjected to suitable heat and pressure.

Figure 7:
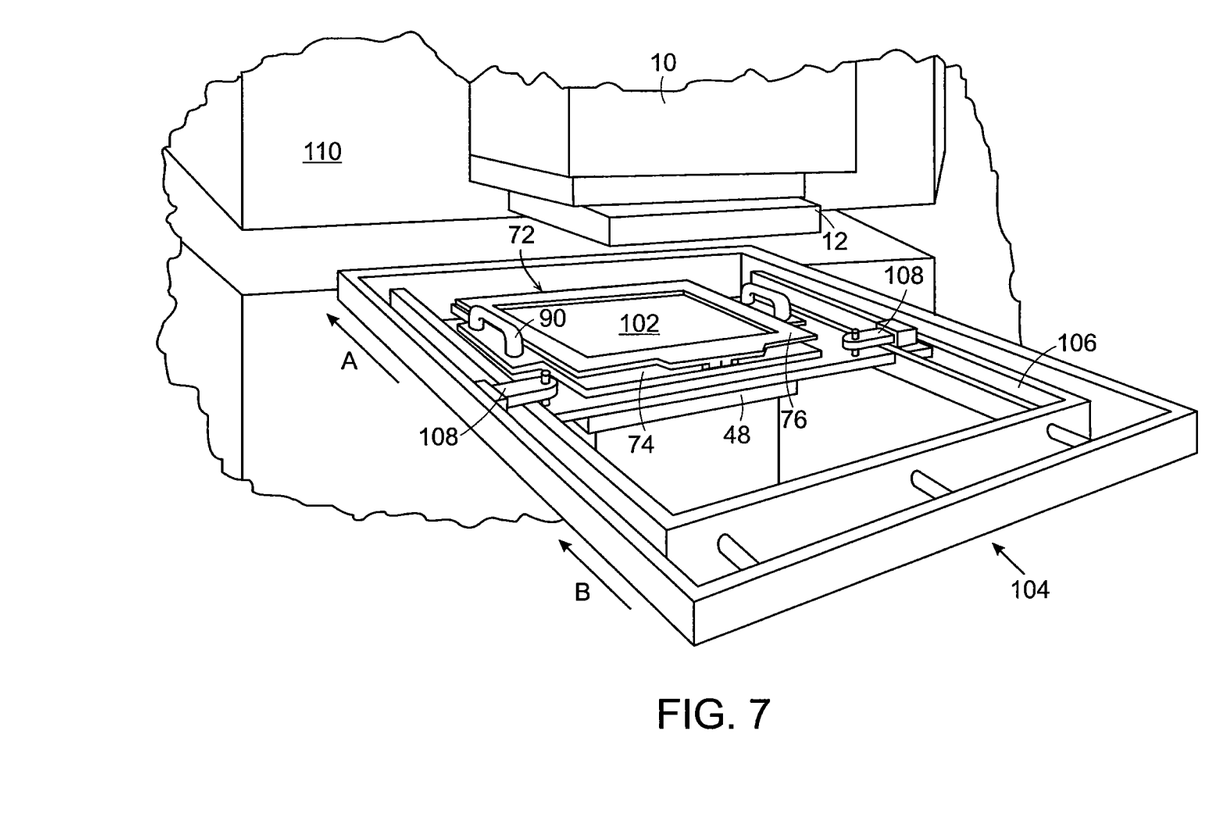
FIG. 7 is a perspective view of the frame of FIG. 5 shown in position between the first and second portions of the mold prior to being formed.

A shuttle mechanism 104, or other transfer mechanism, seen in FIG. 7, may be used to transport frame 72 between the various steps of the manufacturing process. The advantage of this configuration is that a single individual may oversee preparation, heating, and bonding. Furthermore, when bonding is complete, shuttle mechanism 104 is correctly positioned for a subsequent cycle, thereby increasing process efficiency. Specifics regarding the manufacturing method of the present invention are detailed in the following material.

Shuttle mechanism 104 may include a shuttle frame 106 and various clamps 108 that secure components to shuttle frame 72. Shuttle mechanism 104 is used to move frame 72 into an oven 110 in the direction of arrow A. First and second sheets 96, 102 are heated in oven 110 for a predetermined time so as to reach a temperature above their glass transition temperature, but below their melting point. During the heating and forming process, air, or other suitable gas, is injected through nozzle 94 and valve 42. The layer of injected air and spacer 98 combine to prevent first and second sheets 96, 102 from prematurely contacting during the heating step, and to facilitate the sheets forming to the surfaces of first and section portions 12, 48 of mold 10 during the molding step.

Oven 110 can be any conventional oven capable of heating first and second sheets 96, 102 to an appropriate temperature for thermoforming. A typical oven may include a quartz-type radiant heater that evenly raises the temperature of first and second sheets 96, 102. It is to be appreciated that the thickness of first and second sheets 96, 102 may be different. To ensure equal heating, the relative output of the heating elements that correspond with first sheet 96 and those that correspond with second sheet 102 may be adjusted accordingly.

The temperature to which first and second sheets 96, 102 are heated depends upon the specific material used. The material should be heated to a degree that exceeds the softening temperature, but is below the melting point, to ensure proper bonding. As noted above, first sheet 96 may be formed as a blend of acrylonitrile butadiene styrene (ABS) and polyurethane, which has a melting temperature in the range of 390° F. to 410° F. In this embodiment, the temperature to which first sheet 96 should be heated is, therefore, between 345° F. and 365° F. As noted above, second sheet 102 may be formed of thermoplastic polyurethane, which has a melting temperature in the range of 390° F. to 420° F. In this embodiment, a suitable temperature to which second sheet 102 may be heated is between 355° F. and 375° F.

Following heating, shuttle mechanism 104 transports frame 72 out of oven 110 in the direction of arrow B, and positions frame 72 between first portion 12 and second portion 48 of mold 10. Once frame 72 has been properly positioned within mold 10, first and second portions 12, 48 are pressed together, thereby bonding first sheet 96 to second sheet 102 in a thermoforming manner, forming a peripheral seal 112 between first portion 22 and second portion 58 of sidewall 24 of inflatable structure 8, as seen in FIGS. 3-4. A mechanical and chemical bond is created between first and second sheets 96, 102 during this thermoforming process, creating a strong bond between the two dissimilar materials.

Valve 42 extends through seal 112 and is in fluid communication with the interior and exterior of inflatable structure 8. O-ring 46 and valve 42 may, in certain preferred embodiments, be formed of a thermoplastic urethane, and are bonded to projection 40 during the thermoforming process.

During the bonding process, air continues to be injected in through nozzle 94 and valve 42. Additionally, a vacuum is created between the exterior surfaces of first and second sheets 96, 102 and the surfaces of first and second portions 12, 48 of mold 10. The air injected through valve 42 via nozzle 94 and the vacuum created in mold 10 combine to cause first and second sheets 96, 102 to take the shape of first and second portions 12, 48.

Following bonding, the assembly is allowed to cool. First and second portions 12, 48 of mold 10 are then separated, and shuttle mechanism 104 moves frame 72 out of the forming area. Nozzle 94 and valve 42 remain open as frame 72 is removed from mold 10 in order to vent the pressurized air contained within inflatable structure 8. The excess material from the periphery of seam 112 where the bodies of first portion 12 and second portion 48 outside cavities 14, 50, respectively, compress first and second sheets 96, 102 together is trimmed with a laser, or any other suitable cutting device. Nozzle 94 is then removed, and inflatable structure 8 may be inflated to a desired pressure.

As noted above, the resultant inflatable structure 8 is shown in FIGS. 4-5. In a preferred embodiment, first portion 22 of sidewall 24 is formed from second sheet 102 and is of unitary, that is, one-piece construction with first side 20. Second portion 58 of sidewall 24 is formed of first sheet 96 and is of unitary, that is, one-piece construction with second side 56. As seen here, seal 112 extends around the periphery of inflatable structure 8 at the junction of first portion 22 and second portion 58.

The embodiment illustrated in FIGS. 4-5 is an exercise platform. In use, a user stands on first side 20 or second side 56 and tries to maintain a stable position, thereby improving the balance, coordination and reflexes of the user. It is to be appreciated that other embodiments of an inflatable structure formed of dissimilar materials are considered to be within the scope of the invention including, for example, bladders for use in shoewear.

Inflatable structure 8, as illustrated here, has a substantially oval shape. However, other shapes such as circular, rectangular, or any other shapes are considered to be within the scope of the invention.

The more rigid material of first side 20 provides more resistance to the user than the softer material of second side 56. Having an exercise platform with opposed sides having different levels of rigidity provides increased flexibility and utility for the device, since the level of difficulty when using the two sides varies.

As noted above, in a preferred embodiment, a recess 36 is formed in sidewall 24. A projection 40 extends radially out from sidewall 24 within recess 36. Valve 42 is housed within a central aperture 43 formed in projection 40. In a preferred embodiment, projection 40 has a cylindrical shape, with aperture 43 also being cylindrical to receive cylindrical valve 42.

Having valve 42 allows inflatable structure 8 to be inflated and deflated by a user. This allows the user to vary the amount that inflatable structure 8 is inflated, which can alter the difficulty of using the platform, advantageously providing the user with additional flexibility for their workout. Being able to deflate inflatable structure 8 increases its portability.

Figure 9:
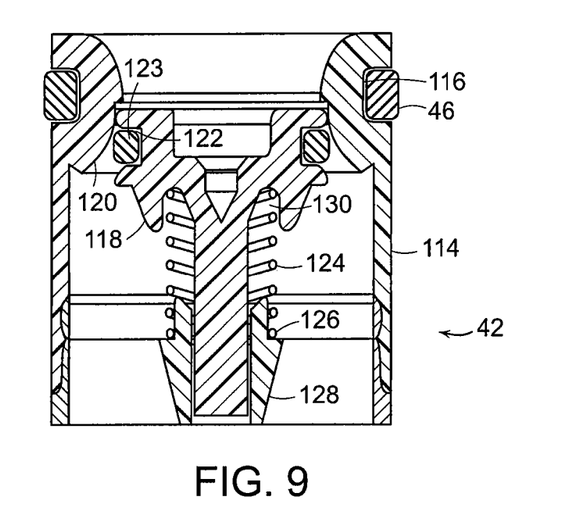
FIG. 9 is a section view of a valve of the inflatable structure of FIG. 4, showing the valve in its closed position.
Figure 10:
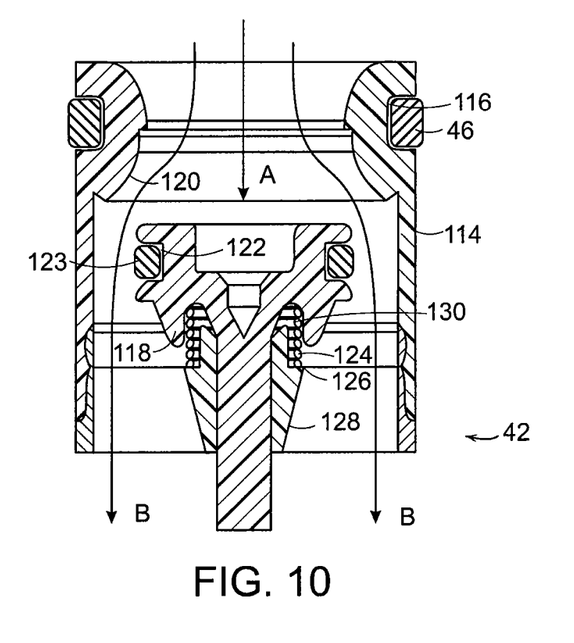
FIG. 10 is a section view of the valve of the inflatable structure of FIG. 4, showing the valve in its open position.

An embodiment of valve 42 is illustrated in FIGS. 9-10, with valve 42 being shown in its closed condition in FIG. 9 and in its open position in FIG. 10. In the illustrated embodiment, valve 42 is a poppet, or puppet, valve. Valve 42 has a cylindrical housing 114, which is seated within aperture 43 formed in projection 40. A recess 116 formed in an outer surface of housing 114 receives a sealing member such as O-ring 46. O-ring 46 engages the interior of aperture 43 and provides a positive seal between valve 42 and projection 40.

A stem 118 of valve 42 engages a shoulder 120 formed on an interior surface of housing 114 to seal valve 42 when it is in its closed position. Stem 118 has a recess 122 formed in its outer surface. Recess 122 receives a sealing member such as O-ring 123, which engages shoulder 120 and provides a positive seal between stem 118 and shoulder 120. A first end of a spring 124 is seated on a shoulder 126 of a base member 128 of valve 42. A second end of spring 124 is received in a recess 130 formed in stem 118. Spring 124 acts to bias stem 118 into its closed position against shoulder 120.

To inflate inflatable structure 8, as seen in FIG. 4, a user simply blows air into valve 42. The air forces stem 118 inwardly against spring 124 in the direction of arrow A, proving a flow path for air into inflatable structure 8 past shoulder 120 and around stem 118, as illustrated by the arrows B. Valve 42 remains closed when inflatable structure 8 is inflated due to the force of spring 124, and back pressure from the air in inflatable structure 8 biasing stem 118 against shoulder 120.

To deflate inflatable structure 8, a user manually depresses stem 118 in the direction of arrow A, forcing it inwardly against spring 124. Air will then escape inflatable structure 8. The user may also compress first and second sides 12, 14 while depressing stem 118, forcing air out of inflatable structure 8.

It is to be appreciated that inflatable structure 8 may be filled with other fluids, or gasses, rather than air. Suitable fluids for filling inflatable structure 8 will become readily apparent to those skilled in the art, given the benefit of this disclosure.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A method of thermoforming an inflatable structure of dissimilar materials comprising the following steps, in combination:

providing a first sheet formed of a first material and a second sheet formed of a second material different than the first material, each of the first sheet and the second sheet having an interior surface and an opposed exterior surface, the interior surface of the second sheet being spaced from the interior surface of the first sheet, and a valve being positioned between the first and second sheets;

heating the first and second sheets to a temperature above their glass transition temperature and below their melting point;

bonding only peripheral edges of the first and second sheets together in a mold having an opposed pair of cavities to form an inflatable structure having a sidewall, a first portion of the sidewall being formed by the exterior surface of the first sheet and a second portion of the sidewall being formed by the exterior surface of the second sheet, a junction of the first and second portions of the sidewall defining a seal around a periphery thereof, the valve extending through the seal and being in fluid communication with an interior and exterior of the inflatable structure; and trimming excess material from the periphery of the inflatable structure.

2. The method of claim 1, wherein the step of providing the first and second sheets includes the step of:

providing a frame for supporting the first and second sheets, the first and second sheets being spaced from one another and the valve being positioned between the first and second sheets.

3. The method of claim 2, further comprising the step of:

transporting the frame between steps of the thermoforming process with a shuttle mechanism.

4. The method of claim 2, wherein the frame comprises a first portion and a second portion secured to the first portion by a hinge.

5. The method of claim 2, further comprising a spacer positioned within the frame between the first and second sheets.

6. The method of claim 1, wherein the step of heating is performed in an oven.

7. The method of claim 1, further comprising the step of injecting pressurized air between the first and second sheets during the heating and bonding steps.

8. The method of claim 7, wherein the pressurized air is injected through the valve.

9. The method of claim 1, wherein one of the first material and the second material is a rigid thermoplastic and the other is a flexible plastic elastomer.

10. The method of claim 1, wherein the first material is a mixture of acrylonitrile butadiene styrene and polyurethane.

11. The method of claim 1, wherein the second material is polyurethane.

* * * * *